US012583447B1

(12) United States Patent　　　　　(10) Patent No.:　US 12,583,447 B1

Harris et al.　　　　　　　　　　　　　(45) Date of Patent:　Mar. 24, 2026

(54) ROADWAY HAZARD DETECTION AND AVOIDANCE

(71) Applicants:Scott C Harris, San Diego, CA (US); Benjamin J Kwitek, Colorado Springs, CO (US)

(72) Inventors: Scott C Harris, San Diego, CA (US); Benjamin J Kwitek, Colorado Springs, CO (US)

(*) Notice: Subject to any disclaimer, the term of this patent is extended or adjusted under 35 U.S.C. 154(b) by 0 days.

(21) Appl. No.: 18/807,459

(22) Filed: Aug. 16, 2024

(51) Int. Cl.
　　*B60W 30/09*　　　(2012.01)
　　*B60W 30/095*　　(2012.01)
　　*B60W 60/00*　　　(2020.01)
　　*G08G 1/16*　　　　(2006.01)

(52) U.S. Cl.
　　CPC ........ *B60W 30/09* (2013.01); *B60W 30/0956* (2013.01); *B60W 60/0015* (2020.02); *G08G 1/16* (2013.01); *B60W 2420/403* (2013.01); *B60W 2556/65* (2020.02)

(58) Field of Classification Search
　　CPC ............. B60W 30/09; B60W 30/0956; B60W 60/0015; B60W 2556/65; G08G 1/16
　　See application file for complete search history.

(56) References Cited

U.S. PATENT DOCUMENTS

| | | | | |
|---|---|---|---|---|
| 9,842,496 B1* | 12/2017 | Hayward | ................ | G01S 19/50 |
| 2018/0164119 A1* | 6/2018 | Becker | ................ | B60W 60/001 |
| 2021/0097311 A1* | 4/2021 | McBeth | ........... | G08G 1/096775 |
| 2022/0262128 A1* | 8/2022 | Nakamura | ............ | G06V 20/58 |
| 2024/0247944 A1* | 7/2024 | Barrera | ............. | G01C 21/3602 |

* cited by examiner

*Primary Examiner* — Anshul Sood
(74) *Attorney, Agent, or Firm* — Scott C Harris, Esq.

(57)　　　　　　　ABSTRACT

A autonomous driving vehicle and system. Sensors that are used for driving are also used for characterizing the roadway for hazards such as potholes and rumble strips. The vehicle avoids the hazards when driving. The vehicle can send information about the hazards to other close vehicles, and also send the information to a server that creates a global database.

16 Claims, 4 Drawing Sheets

299 — RTM info

300 — Find locat vehicles
- in front
- behind
- opposite

305 — Exchange info with local vehicles

299 — RTM

400 — Send to global database server

310 — Send to vehicles

320 — Enter a destination navigate

325 — Route includes hazards

330 — Red items nave

ROADWAY HAZARD DETECTION AND AVOIDANCE

BACKGROUND

Modern vehicles provide a wide array of driver assistance technologies. Many of the current technologies address route navigation, traffic, traffic control devices and other factors involved with driving on public roads.

Throughout this application, cars, vehicles and automobiles will be referenced. It should be noted that these words also include other forms of transportation on public roads including buses, trucks, motorcycles, all-terrain vehicles, Autonomous Vehicles (AVs) and other moving structures that utilize the roadway. AVs may refer to completely autonomous vehicles (no human driver assistance) or vehicles using semi-autonomous driving modes-likely with the support of a human driver.

Typical autonomous vehicles drive from their current location to their destination. Roadways are ideally flat and free of debris and imperfections, but in reality, this is not always the case. Random hazards in the road can include areas of the road that are not flat, which may be bumpy, uneven, potholed, cracked, or have any number of imperfections. This can be caused by openings in the road, like potholes or cracks that can occur due to weather. It can be caused by imperfectly finished road constructions. Items can be in the road that have fallen off other vehicles or have blown into the road. Examples include pieces of wood, metal, furniture, equipment, tools, plastic, bolts, screws, nails and other items that could damage the tires of the vehicle. Items in the road can also include rocks, animals (alive and dead) and organic materials such as tree branches. Some of these items could result greater vehicle damage and perhaps an accident and potential injuries.

SUMMARY OF THE INVENTION

The inventors have recognized that human drivers can see hazards on the road and avoid them. AVs or semi-autonomous vehicles do not understand that these random hazards exist in the roadways. In autonomous driving modes, modern vehicles will simply drive over or through these obstacles. While the human "driver" could notice plywood with nails sticking through it, or the pothole, the vehicle's autonomous driving technologies miss it could result in a flat tire(s) for the owner to manage.

The present invention provides for various technologies, methods, and systems to help vehicles identify road hazards and modify the vehicle's path to avoid these hazards. The present application is based on the recognition that the actual roadway conditions flatness may play a role in the particular route that the AV should take.

Embodiments describe monitoring the flatness of a road and changing the navigating of the vehicle to navigate around areas on the road whose flatness deviates by more than a specified amount.

Embodiments describe monitoring for items in the road and causing the autonomous vehicle's route to navigate to avoid these items in the road.

DETAILED DESCRIPTION

The present application describes a system for using a computer-based driving system to navigate an autonomous vehicle or AV. The AV can be any vehicle that uses a computer to carry out or assist with any part of the driving, referred to herein as an AV. Each of these embodiments are based on recognitions by the present inventors.

A first embodiment uses the sensors that are already used in the AV for driving for detecting hazards on the road. The hazards can be anything on the route or road that can interfere with the navigation along the route or road. In these embodiments, the hazards include items on the road, potholes on the road, road imperfections and other items that could potentially damage the car or cause an accident. Uneven pavement, such as rumble portions in the road, could cause less comfortable driving. All of these items are generically referred to as hazards.

The embodiments describe using cameras, however any existing automobile sensor, such as LiDAR and radar that are in the car can be used. For example, Tesla™ uses the vehicle's cameras to determine distances, for example a distance to an object. These distances can be used to monitor the road surface for hazards. In an alternative embodiment, a special purpose sensor can be used to detect hazards in the road.

In embodiments, the road surfaces are monitored for items in the road in real time, and the computer determines if these items in the road are hazardous to the driving of the vehicle, and whether to characterize them as "hazards" and the route is modified to avoid these hazards.

In embodiments, a database of hazards reported by others are verified and used by the navigation system running in the vehicle to adjust the route of the vehicle to avoid those hazard(s), for example, to cause the vehicle to change lanes to avoid a hazard, or to slow down to reduce the effect of the hazard on driving. The slowing down still avoids the hazard in the sense that going slower can reduce the effect of the hazard on the vehicle.

Figure 1:
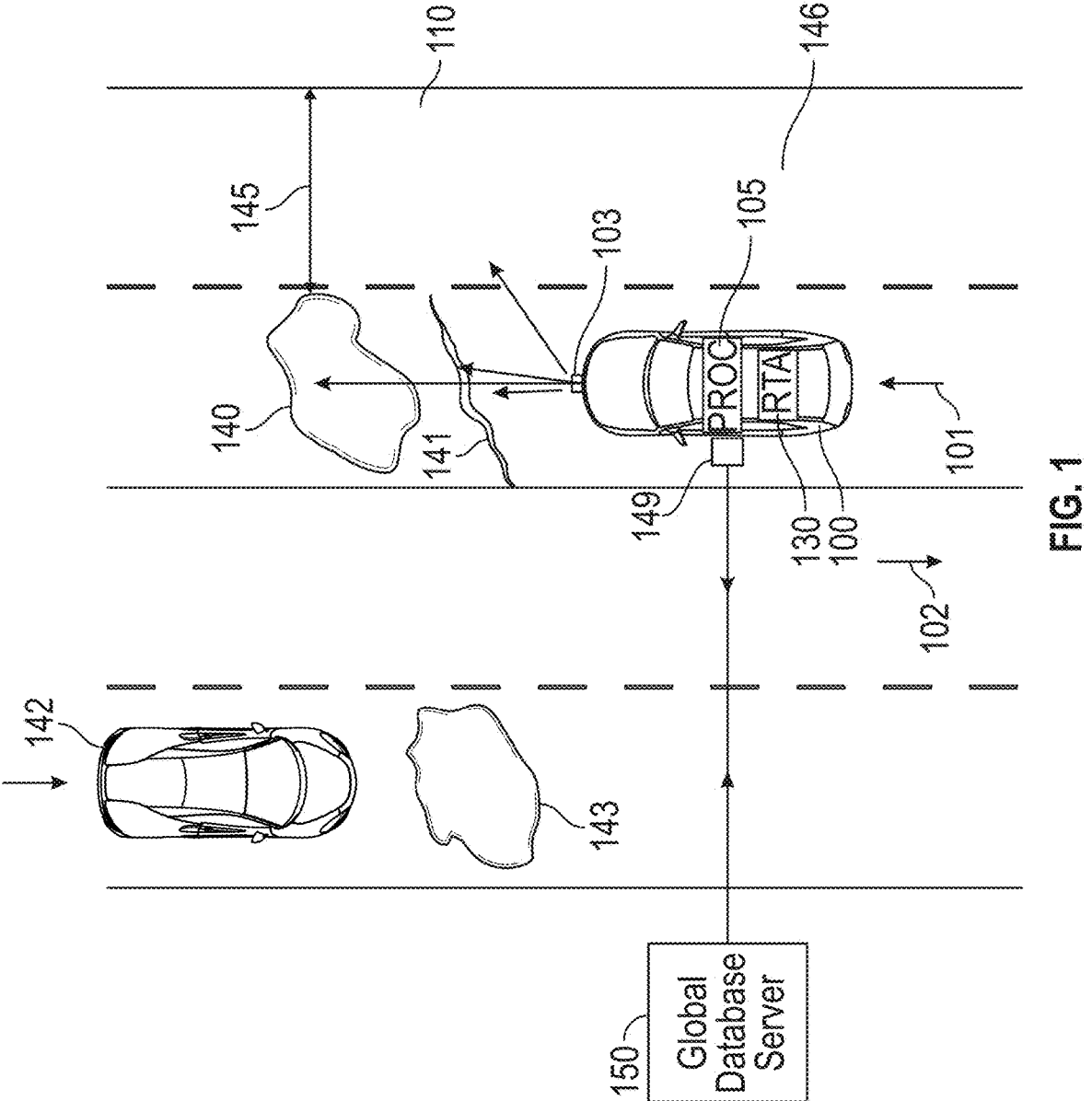
FIG. 1 shows a block diagram of a vehicle on a road with items in the road.

FIG. 1 shows a diagram of the autonomous vehicle 100, which is driving along a roadway 110 in the direction 101. There is also an oncoming road lane of traffic going in the direction 102. The AV 100 uses its sensors to monitor in all directions to look for potential vehicles that need to be avoided either in normal driving, or when changing lanes or turning. The AV 100 forms a real-time map 130 that includes not only other vehicles, but also objects in the road. The objects can include indentations 140, 141 in the road ahead of the vehicle, which can be cracks or potholes in the road for example. The map also includes objects 143 in the oncoming direction 102, that is objects that the vehicle 100 will not encounter, but that other vehicles 142 going in the direction 102 might encounter.

The objects are characterized to determine if they, or might be, hazardous to the driving of the vehicle, and they are characterized as "hazards" if so.

Figure 2:
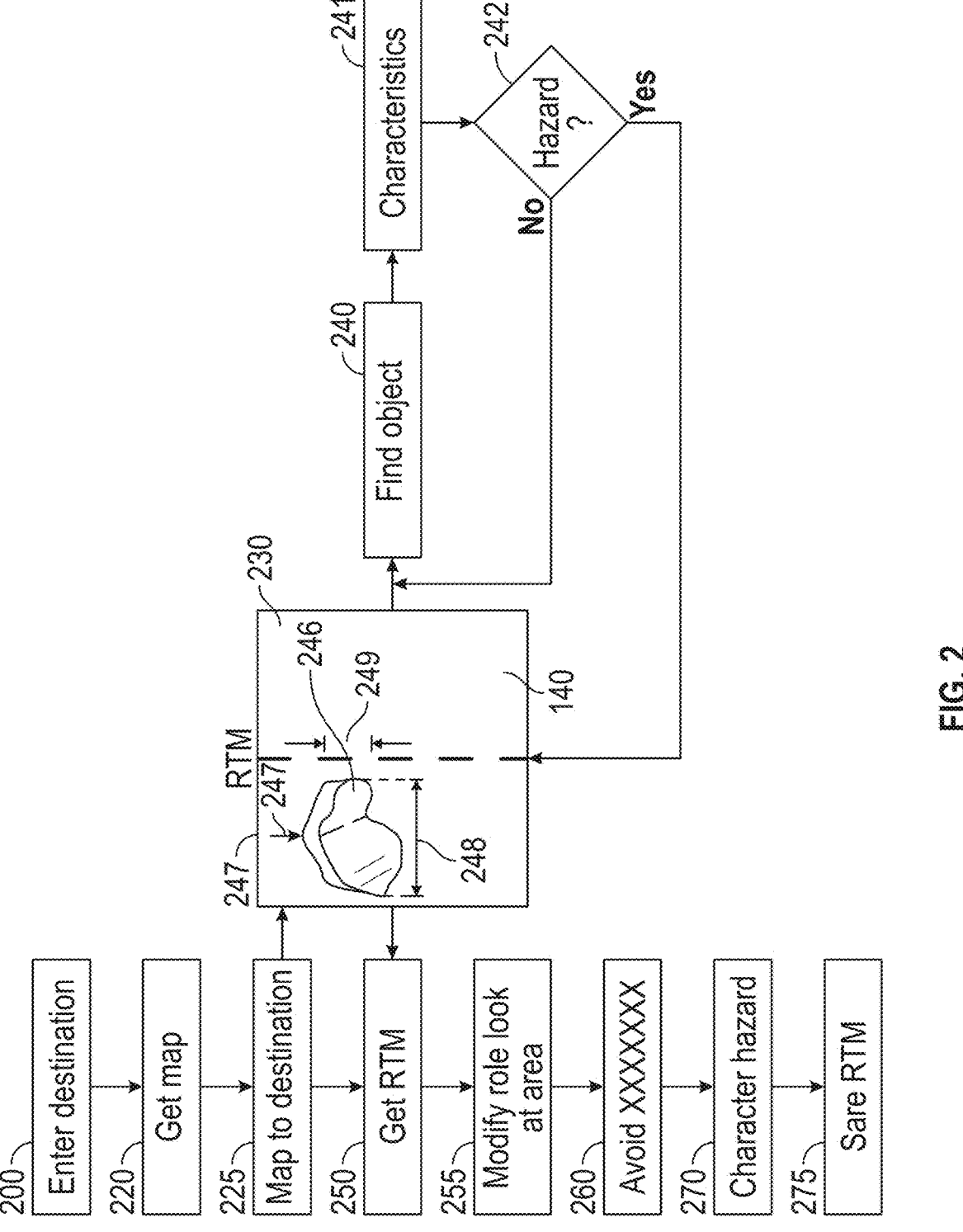
FIG. 2 shows a flowchart of operation of a first embodiment which forms a real time map of hazards in the road.

All of this information is used by the processor 103 in the vehicle to form the real-time map 130. The real-time map is used as described in the flowchart of FIG. 2, which can be run on the processor 103 as described herein.

The user gets in the vehicle, and in order to start the autonomous operation enters a destination at 200. The vehicle also obtains a map at 220, from its memory or over the air.

At 230 represents the formation of the real-time map, which is formed in real time using the sensors on the vehicle.

230 illustrates how the real-time map is formed by identifying objects, such as 246 in the roadway. Each object is found at 240, and then its characteristics are also identified at 241. The characteristics of each object in the road can be determined as their front to back length 249, side to side with 248 and depth 247. Based on these characteristics, the computer determines if this is a hazard.

The real time map also obtains data about how to avoid an object, including distance 145 between the object and the edge of the road, whether there is another lane such as 146 that could be used to navigate around the pothole, whether there is an alternative path, that such as 141 that encounters only a smaller part of the object to avoid the worst of the damage from the object. Determination of a hazard can be, for example, any opening or variance in the road greater than one inch or can be any other combination of parameters.

Figure 5:
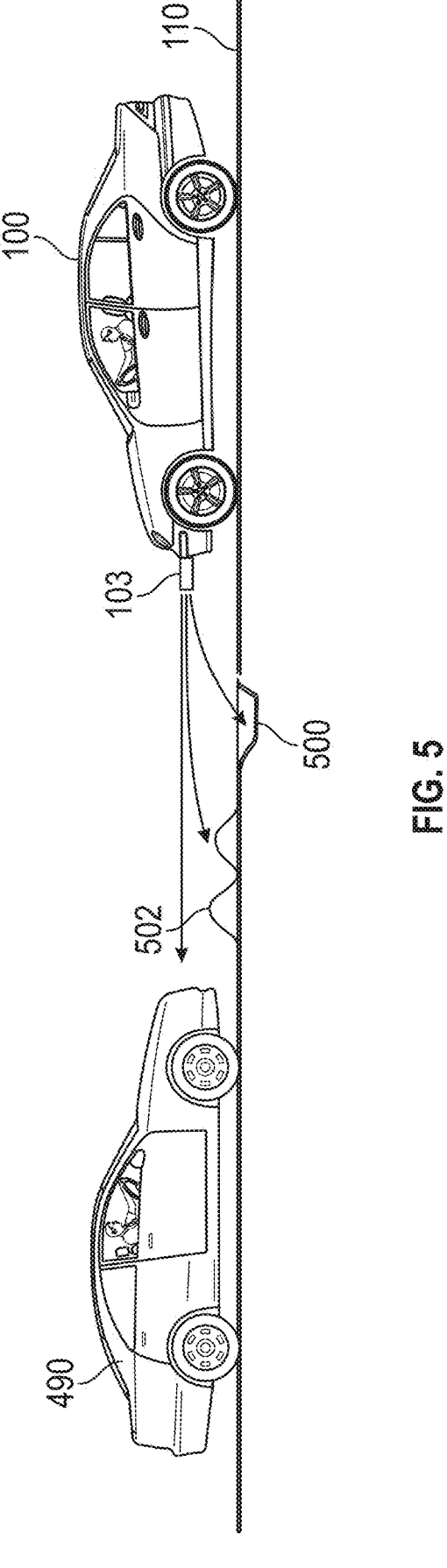
FIG. 5 shows a diagram showing vehicles on a road.

FIG. 5 shows a side view of the vehicle, on the road 110, and shows how the sensor 103, which is in one embodiment, the same sensor that see the other vehicles on the road such as 499, finds indents 500 in the road such as potholes, and finds uneven areas, or "rumbles" 505 in the road.

If the object is determined to be a hazard at 242, then this is included in the real-time map as a hazard.

The real-time map is then received at 250, and used to form or modify the route at 255.

In embodiments, the objects can also be identified, in terms of what they are. For example, an object such as 140 can be identified as a pothole based on its size and depth. If the real time map finds a pothole in the road, it also includes the location of the pothole, and other information about the pothole that enables the vehicle to avoid the pothole.

In an embodiment, if the width 248 of the item 246 is less than the width of an automobile wheel, the vehicle can drive right over the item, and nothing will happen. The depth is less than a certain threshold depth, which may be different for different automobiles, but can be for example, ½ or ¾ inch, a pothole will not be deep enough to cause problems.

If either the pothole is not big enough or deep enough then 242 does not characterize the object as a hazard, and it is not added to the hazard list.

However, if the pothole is big enough or deep enough to cause problems, it is added to the real time map received by the vehicle at 250, and the vehicle can modify its root at 255 to attempt to avoid the hazard. This may be done by the system looking at the area, to determine if the vehicle can change lanes or move out of the way to avoid the hazard. This is done by looking for vehicles on both sides of the of the AV in question, looking at the distances such as 145, and trying to avoid, as much as possible, the hazard. In one embodiment, the vehicle can change lanes to avoid the pothole. In an embodiment, the vehicle can change it's position in the lane, to a position other than at the center of the lane, to avoid the pothole.

For example, with an indentation in the road it may be better to just allow one tire to go through it. This avoidance routine at 260 is carried out, and if the car can safely avoid it, then this is done.

Similarly, for "rumbles" in the road, they are avoided if possible.

If not, a mitigation routine is carried out where the AV is slowed down as much as possible, after checking the vehicles behind and looking at all traffic. If this if it is safe, the vehicle is slowed down as much as possible to try and avoid damage from the hazard. If possible based on the surroundings, the vehicle can be stopped entirely to allow a manual attempt to drive around the hazard.

After this, the save routine begins, where the vehicle saves the information about this hazard after characterizing it.

At 270, the vehicle characterizes the hazard as being permanent or more transitory. Examples of permanent hazards include things like potholes and ridges in the road that will take at least days, and more likely months, to be mitigated. Transitory items may include items that have fallen out of vehicles, and are reasonably likely to be cleared within hours rather than days.

At 275, the RTM is stored. Of course, when a vehicle travels on any route, it is more likely to travel in the same location again. People usually travel the same routes over and over, so it is more likely that the user will travel through the same location than through new locations.

Anything saved in the local database will be included as part of the future navigations.

This data can be shared with other recipients so that the other recipients can use the data found.

Figure 3:
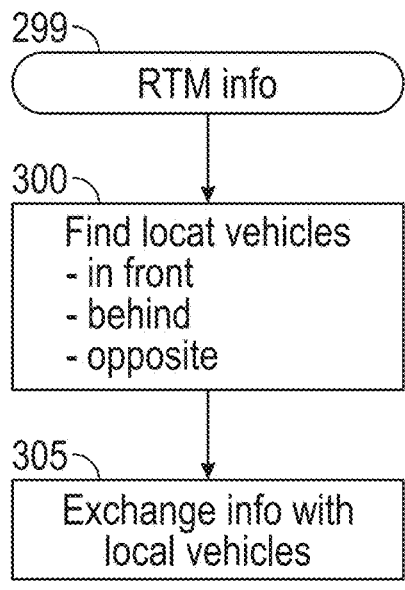
FIG. 3 shows a flowchart of using a local database sharing.

An embodiment shares the information with local vehicles, as a real-time function. FIG. 3 illustrates the local database embodiment where the data including the information about the size and location of the pothole 143 is shared with local vehicles, including a vehicle behind the current vehicle which will eventually come upon the same path, and also oppositely direction traveling vehicles 142. This enables the oppositely traveling vehicle 142 to obtain information about the pothole 143 that is in its path. By sharing information between the vehicles, the vehicle 100 can receive information that is received by vehicle 142 which has traversed the path 101 in the opposite direction, thus providing extra time for the vehicle to react. This local database sharing gives the vehicles more time to adjust to the hazards, by sharing with the local vehicles.

For example, in an embodiment, certain automakers may include the ability to communicate this via Wi-Fi, cellular or some other network with other vehicles of the same make or other makes with similar configurations. Tesla vehicles typically receive mapping information over the cellular network, and can receive local information as part of the mapping network information.

300 represents an operation to find local vehicles, that is vehicles which will encounter the same hazard that was encountered by the main vehicle. This can be done by investigating path information for the other vehicles around it, or simply sending out a global message indicating the current vehicle's path, and indicating the hazard in the path. This is then sent to the local vehicles at 305. The local vehicles can use the information. The vehicle can attempt to verify the information in some way, e.g. by using their own real-time map.

Figure 4:
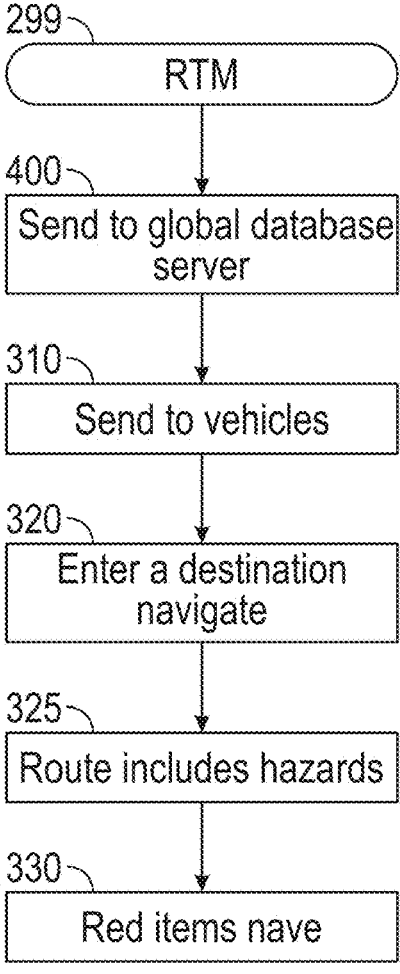
FIG. 4 shows a flowchart of using a global database sharing.

In another embodiment, shown in FIG. 4, an operation of global databases is used, where the databases can be shared with other vehicles besides the local vehicles.

The global database of information can become part of the mapping information used by the vehicles. The global database embodiment relies on different kinds of information referred to herein as databases. The databases are collections of real-time information that are received from other vehicles. In an embodiment, vehicles have communication devices 149 that send its real time map information to a global database server 150 and receives information from other vehicles' real time map information from the global database server.

In one embodiment, the real-time map information 399 from the vehicle, saved at 275, is also sent to a central database at 400. The central database verifies the information at 305, either using its own independently obtained information, or by verifying an item of information when it has been received some number of times, for example information received 10 times from 10 different sources can be verified as correct. The verified information is established as being part of the database, which can be part of the mapping information, or can be separate from the mapping information but used by the system to as part of the map to the destination.

The verified information is sent to the different vehicles at 410, either as part of the mapping information, or as separate information which is used along with the mapping information.

At 420, the vehicle has received this information, and a destination is entered, causing the vehicle to begin to navigate to the destination.

The vehicle system operates to map to the destination, by forming a route from the current location to the destination. Part of that routing at 325 is to map around any obstacles that were included from the database. Therefore, if their database indicates that there is a pothole in the road, the route also includes the location of the pothole, and other information about the pothole that enables the system to map around the pothole. This may include the depth of the pothole, the 140, the distance 145 between the pothole and the edge of the road, whether there is another lane such as 146 that could be used to navigate around the pothole, whether there is an alternative path, that such as 141 that avoids the worst of the pothole.

At 430 the AV carries out real-time navigation by using the received database, and also using the real-time map information 299 that is being constantly formed using this the sensors 103 on the vehicle along with the processor 120. The real-time map, for example, can find hazards such as potholes that were not previously found by other vehicles. This can include potholes that were newly formed or other items that were newly formed, such as items that have fallen out of a vehicle.

At 430, based on all of this information, the autonomous vehicle carries out real-time navigation using the mapping information, the received obstacle information, and real roadway conditions mapping. The real roadway conditions mapping may also include forming its own real-time map, to provide the information to the database, and also to find obstructions which may not have been mean hazards which may not have been previously reported, or sharp been newly formed.

The global information can be received as part of traffic information in one embodiment.

This enables vehicles to have much earlier information and notification about the hazards.

The analysis of hazards can be used to determine the degree of seriousness of the hazard and to determine how much of the hazard information is going to be sent to the vehicle. An extremely dangerous hazard, such as a piece of plywood with nails coming out of it, can be sent as an emergency send, while other hazards such as potholes can be sent as part of the normal traffic information update.

In an alternative embodiment, the hazard information can be sent as part of the real-time mapping information, which is in any case received by vehicles in real time to avoid the traffic.

The sensors 103 can include cameras, LiDAR, lasers, radar, and sound recording. The sensed conditions of the road could be compared to historical road recordings. This would indicate the potential presence of hazards or other items.

In embodiments where the sensors 103 on the vehicles include microphones and sound detection equipment to monitor the noises coming from the tires. These microphones can record and/or analyze sounds that are compared against a database of sounds for various obstacles and hazards. For example, the sound of air leaving the tires would be different than the sounds of normal driving. This data would be analyzed and compared against other sources of data to make a determination about the vehicles condition. If the vehicle detected sounds indicative of damage, the driver/passenger could be alerted, and vehicle's speed could be reduced to lower the chances of a potential accident.

In yet another embodiment, the driver in the vehicle has a manual entry data item, which provides them with the ability to mark or report an obstacle that was unseen by the vehicle. While this report may not help that person's vehicle, the data would be relayed to other vehicles so that they could avoid the hazard. In this way, the hazards would be crowd-sourced and provide benefits to the community of drivers utilizing semi-autonomous vehicles.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A autonomous driving vehicle system comprising:
   a vehicle;
   a sensor, attached to the vehicle and detecting conditions around the vehicle and producing signals indicative of roadway conditions around the vehicle that are detected, and producing outputs indicative thereof;
   a computer operating for automated driving operation of the vehicle by navigating to a destination, the computer using the outputs for the navigating in order to avoid collisions with other vehicles on the roadway and to stay within specified areas of the roadway;
   the computer operating for using the outputs from the sensor for analyzing a roadway ahead of the vehicle, to identify items in the roadway using the signals from the sensor, where the items in the road that are identified by the signals from the sensor,
   the computer analyzing the items in the roadway to determine sizes of the items, and based on the sizes, characterizing the items in the roadway as being hazards that are likely to interfere with the operation of the vehicle, when the items have a specified size and as not being hazards that are likely to interfere with the operation of the vehicle, when the items do not have the specified size;

the computer forming a database of the hazards that are likely to interfere with the operation of the vehicle in the roadway including locations of the hazards in the roadway;

wherein the information indicative of the database of hazards is sent to a global database server, and where the global database server verifies the hazards by finding the same information received multiple times from multiple sources, to form verified as correct information about a hazard, and where verified as correct information about a hazard is sent to other vehicles, and information about a hazard that is not verified as correct is not sent to other vehicles;

the computer receiving information from the global database server about hazards from other vehicles that are verified as correct and adds the information to the database of hazards in the roadway; and the computer carrying out the navigating to the destination using the database of hazards in the roadway to avoid the hazards in the roadway.

2. The system as in claim 1, wherein the hazards are characterized as being a more permanent hazard including an imperfection in the roadway that will take longer to be mitigated, or a more transitory item that can be removed from the roadway and will take less time to be mitigated.

3. The system as in claim 1, wherein the another recipient is other vehicles on the same roadway, including vehicles that are behind the vehicle and vehicles traveling in an opposite direction to the vehicle, and the information indicative of the database of hazards information is sent to the other vehicles on the same roadway.

4. The system as in claim 1, wherein the computer analyzes the items to determine sizes of the items determining a front to back length of the item, a side to side width of the item, and a depth of the item, and determines if each item is a hazard based on said sizes that are determined.

5. The system as in claim 4, wherein the computer also obtains data about how to avoid a hazard, including a distance between the object and an edge of the road, whether there is another lane that could be used to navigate around the hazard.

6. The system as in claim 5, wherein the vehicle avoids the hazards by traveling around the hazards using the data about how to avoid the object.

7. The system as in claim 1, wherein the vehicle avoids the hazards by changing to a lane which does not include the hazard.

8. The system as in claim 1, wherein the vehicle avoids the hazards by slowing down while traversing the hazard.

9. A method of routing and driving an autonomous driving vehicle comprising:

producing a route in a vehicle;

using an autonomous driving system to drive the vehicle along the route;

producing signals indicative of roadway conditions around the vehicle from a sensor, attached to the vehicle;

using a computer operating for automated driving operation of the vehicle by navigating to a destination, the computer using the outputs from the sensor for the navigating in order to avoid collisions with other vehicles on the roadway and to stay within specified areas of the roadway;

using the computer for using the outputs from the sensor for analyzing a roadway ahead of the vehicle, to identify items in the roadway using the signals from the sensor, using the computer analyzing the items in the roadway, and characterizing the items in the roadway as being hazards that are likely to interfere with the operation of the vehicle, when the items have a specified size and as not being hazards that are likely to interfere with the operation of the vehicle, when the items do not have the specified size;

using the computer for forming a database of the hazards that are likely to interfere with the operation of the vehicle in the roadway including locations of the hazards in the roadway;

wherein the information indicative of the database of hazards is sent to a global database server, and where the global database server verifies the hazards by finding the same information received multiple times from multiple sources, to form verified as correct information about a hazard, and where verified as correct information about a hazard is sent to other vehicles, and information about a hazard that is not verified as correct is not sent to other vehicles;

the computer receiving information from the global database server about hazards from other vehicles that are verified as correct and adds the information to the database of hazards in the roadway; and using the computer carrying out the navigating to the destination using the database of hazards in the roadway to avoid the hazards in the roadway.

10. The method as in claim 9, further comprising using the computer to characterize the hazards as being a more permanent hazard including an imperfection in the roadway that will take longer to be mitigated, or a more transitory item that can be removed from the roadway and will take less time to be mitigated.

11. The method as in claim 10, further comprising using the computer to control sending information indicative of the database of hazards found in the roadway to another recipient wherein the another recipient is other vehicles on the same roadway, including vehicles that are behind the vehicle and vehicles traveling in an opposite direction to the vehicle, and the information indicative of the database of hazards information is sent to the other vehicles on the same roadway.

12. The method as in claim 10, wherein the information indicative of the database of hazards is sent to a global database server, which sends the information to a plurality of different vehicles.

13. The method as in claim 10, wherein the computer analyzes the items to determine sizes of the items determining a front to back length of the item, a side to side width of the item, and a depth of the item, and determines if each item is a hazard based on said sizes that are determined.

14. The method as in claim 10, wherein the vehicle avoids the hazards by traveling around the hazards.

15. The method as in claim 10, wherein the vehicle avoids the hazards by changing to a lane which does not include the hazard.

16. The method as in claim 10, wherein the vehicle avoids the hazards by slowing down while traversing the hazard.

\* \* \* \* \*